Nov. 11, 1924.  1,514,982

J. M. MEYERS

AGRICULTURAL IMPLEMENT

Filed Jan. 17, 1920   2 Sheets-Sheet 2

Inventor
John M. Meyers

By Attorneys
Blackmore, Spencer & Flint

Patented Nov. 11, 1924.

1,514,982

UNITED STATES PATENT OFFICE.

JOHN M. MEYERS, OF JANESVILLE, WISCONSIN.

AGRICULTURAL IMPLEMENT.

Application filed January 17, 1920. Serial No. 352,137.

*To all whom it may concern:*

Be it known that I, JOHN M. MEYERS, a citizen of the United States, and a resident of Janesville, county of Rock, and State of Wisconsin, have invented certain new and useful Improvements in Agricultural Implements, of which the following is a full, clear, concise, and exact description, such as will enable others skilled in the art to which the invention relates to make and use the same, reference being made therein to the accompanying drawings, which form a part of this specification.

This invention relates to agricultural implements of the type including a tractor and a tractor operated harvesting mechanism, especially a mechanism of the mower type. The invention includes among its objects the provision of a harvesting apparatus including a tractor having positively driven wheels arranged in pairs on the two sides of the tractor, also the combination with a tractor of a floating implement frame supported in part by yielding means on the tractor and in part by a shoe or wheel contacting with the ground surface, also the combination with a tractor of a harvesting mechanism arranged to be operated by the engine of the tractor, also the provision of improved transmission and control devices for the driving means.

With the above and other objects in view as will hereinafter more fully appear the invention comprises the combinations and sub-combinations herein described and set forth in the claims hereto appended.

In the accompanying drawings showing one embodiment of my invention,

Fig. 4 is a detail view showing a section through the axle of one of the tractor wheels, and Fig. 5 is a view showing a modified form of control device for the sickle actuating means.

Figure 1:
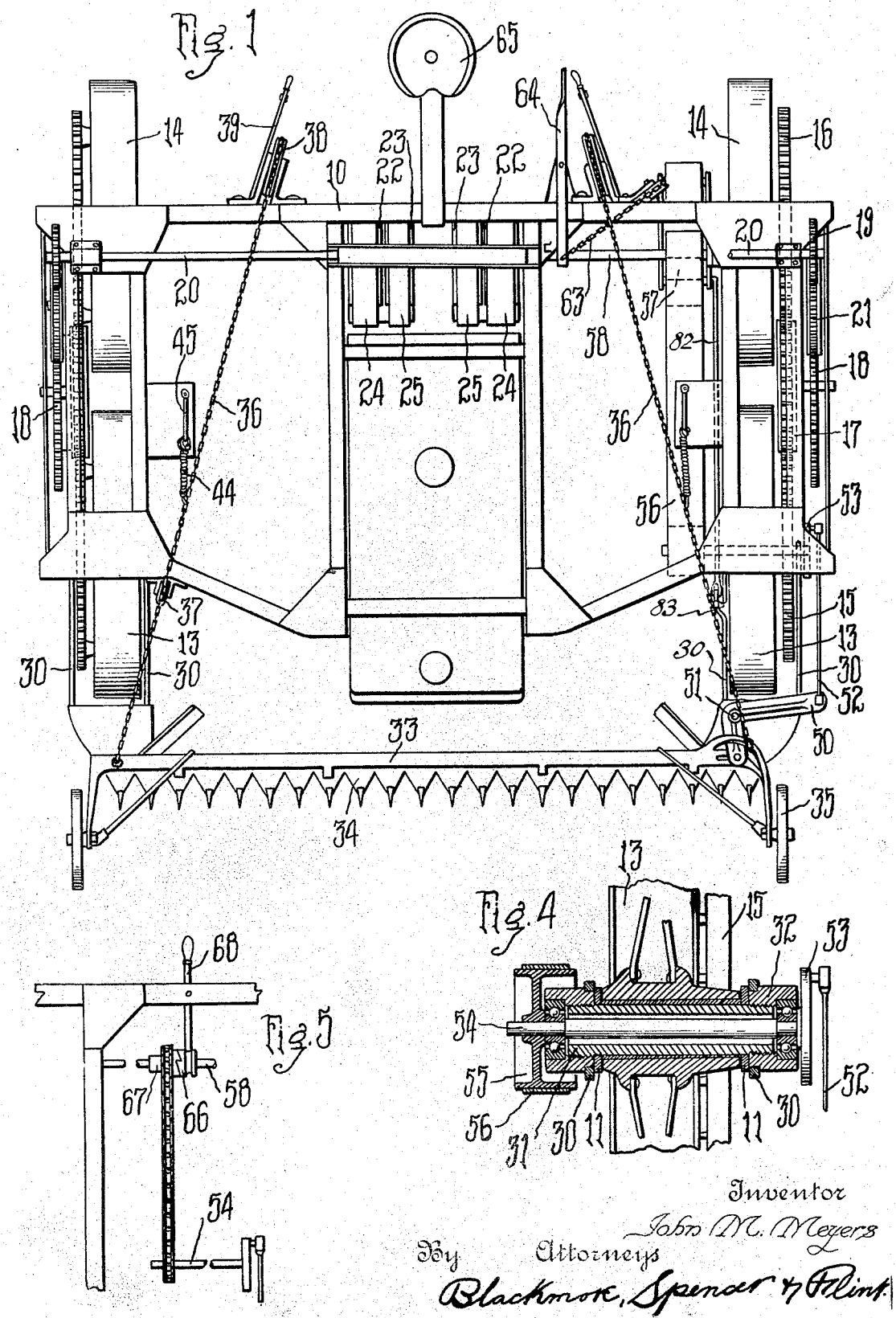
Fig. 1 is a plan view of a tractor having a mower attachment secured in operative relation thereto.

In the drawings, 10 indicates the frame of a tractor having the depending portions 11, 12, the portions 11 supporting at their lower ends the axles of the forward traction wheels 13, and the portions 12 the axles of the rear traction wheels 14. Since the axles of these wheels remain at the same angle relative to the frame of the machine it will be understood that the tractor is steered by driving, i. e., its direction of travel is changed by changing the relative rate or direction of rotation of the wheels upon one side as compared with those on the other.

In order to drive the traction wheels I provide the front and rear wheels respectively with toothed gears 15, 16, each pair of toothed gears being engaged by a lantern gear 17. Coaxial with gear 17 is toothed gear 18, driven from pinion 19 on engine driven shaft 20 through the intermediate lantern pinion 21. The shaft 20 is driven from the engine by direct and reverse pulleys 22, 23, and belts 24, 25 extending from pulleys arranged to be driven constantly by the engine in any suitable manner, one of these pulleys being shown at 26, Fig. 2. The shaft 20 on one side of the machine is independent of the corresponding shaft 20 on the other side, the driving mechanism being merely duplicated for the two sides. It will be seen therefore that by the provision of suitable tightening devices for the direct and reverse belts and by proper manipulation thereof the pair of traction wheels on one side may be driven either in a forward or reverse direction or permitted to remain at rest independently of the pair upon the other side.

The mower frame comprises the side members 30 which are pivotally mounted preferably coaxially with the front wheels of the tractor. This mounting includes, as shown in Fig. 4, a fixed hollow axle 31 on which the member 30 is secured by collar 32 screwed on the end of the axle. The cutter bar 33 in which the sickle 34 is mounted to reciprocate in the usual manner is carried by the side members 30. Wheels 35 may be mounted adjacent the ends of the cutter bar to support in part the weight of the mower attachment. Additional supporting means is provided consisting of the flexible elements, as chains, 36, attached to the mower frame and passing over segments 37 pivoted at the front of the tractor, and extending thence to the segment 38 pivoted at the rear end of the tractor. I have provided means for operating this chain to raise or lower the mower frame consisting of the hand lever 39 carrying detent 40 co-operating with fixed segment 41. The chain may be provided with an adjustable block 42 against which the hand lever may engage when depressed to thereby retract the chain. An additional or alternative operating device is provided comprising a foot lever 43 suitably secured to the end of the chain.

It will be seen that the hand lever with its associated parts provides a means whereby the cutter-bar may be raised and retained in any desired position while the foot lever may be employed to assist in elevating the cutter-bar or may be used to lift the bar temporarily, as in passing over an obstruction.

A spring 44 is secured at one end to the elevating chain 36, and the other end is attached to a loop 45 suitably mounted upon the frame of the tractor. This spring serves to yieldingly support a portion of the weight of the mower frame and related parts, thereby permitting the mower parts to float over the ground to a certain extent. The attachment of the spring to the loop 45 permits the spring to move freely when the chain is retracted for the purpose of elevating the cutter-bar.

It will be noted that the elevating and supporting devices are duplicated for the two sides of the machine thereby rendering it possible to manipulate either end of the cutter-bar to some extent independently of the other, or to raise both ends simultaneously with less effort than would otherwise be possible.

The means for driving the cutter-bar may comprise an elbow lever 50 pivoted at 51 on the mower frame and connected by pitman 52 to crank disk 53 secured upon one end of shaft 54 suitably journaled in the hollow axle 31. The other end of shaft 54 carries a pulley 55 operatively connected as by belt 56, to pulley 57 on the main shaft 58, which is constantly driven by the engine 59. A belt tightener pulley 60 carried by elbow lever 61 and actuated by weight 62 operates to tighten the belt. In order to loosen the belt to interrupt the driving connections I provide a chain 63 connected to a lever 64 so located as to be operable by the knee of the tractor driver when in his usual position on seat 65.

Figure 2:
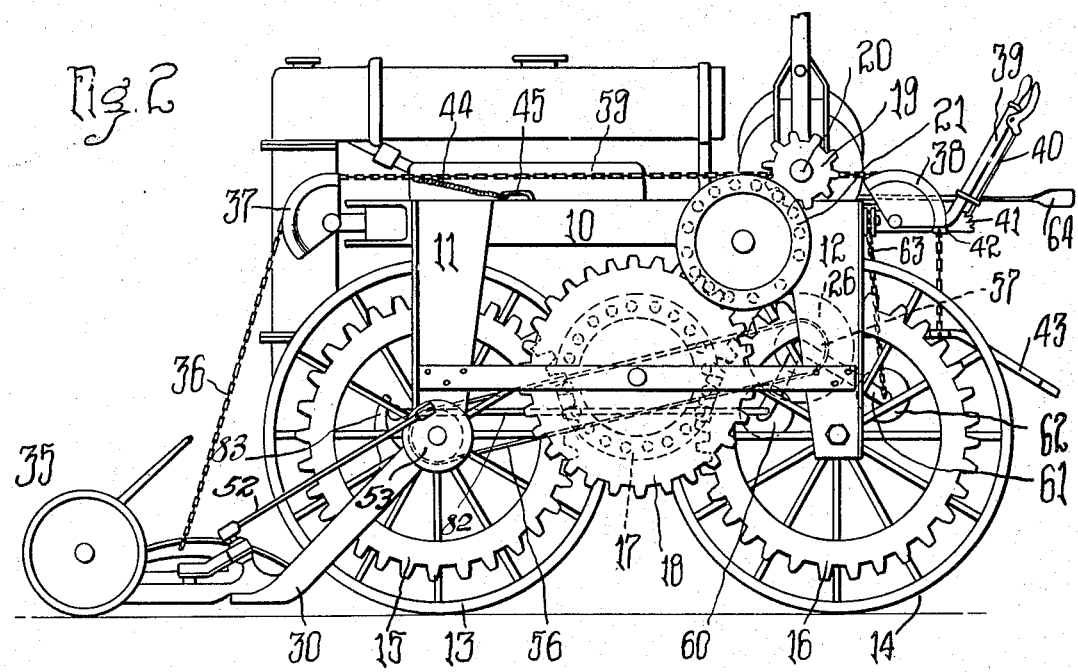
Fig. 2 is a side elevation of the tractor and mower.

In addition to the device actuated directly by the operator as above described, I have provided an automatic means for interrupting the actuation of the cutter mechanism upon the elevation of the cutter frame. This means comprises a reciprocable rod 82, connected at one end as shown in Fig. 2 to the frame of the tightening pulley 60, the other end being positioned adjacent to a cam member 83 carried by some part of the cutter frame, as by one of the bars 30. The cam is so formed and positioned with reference to the rod 82 that the elevation of the frame will cause the rod 82 to be moved in a direction to swing the tightening pulley 60 away from the belt 56, thereby interrupting the driving connection to the cutter.

A modified form of drive is shown in Fig. 5, the shaft 54 in this case being driven by a sprocket chain from shaft 58, and a clutch 66 being interposed to connect the shaft 58 to the sprocket wheel 67, a lever 68 being provided to operate the clutch.

Figure 3:
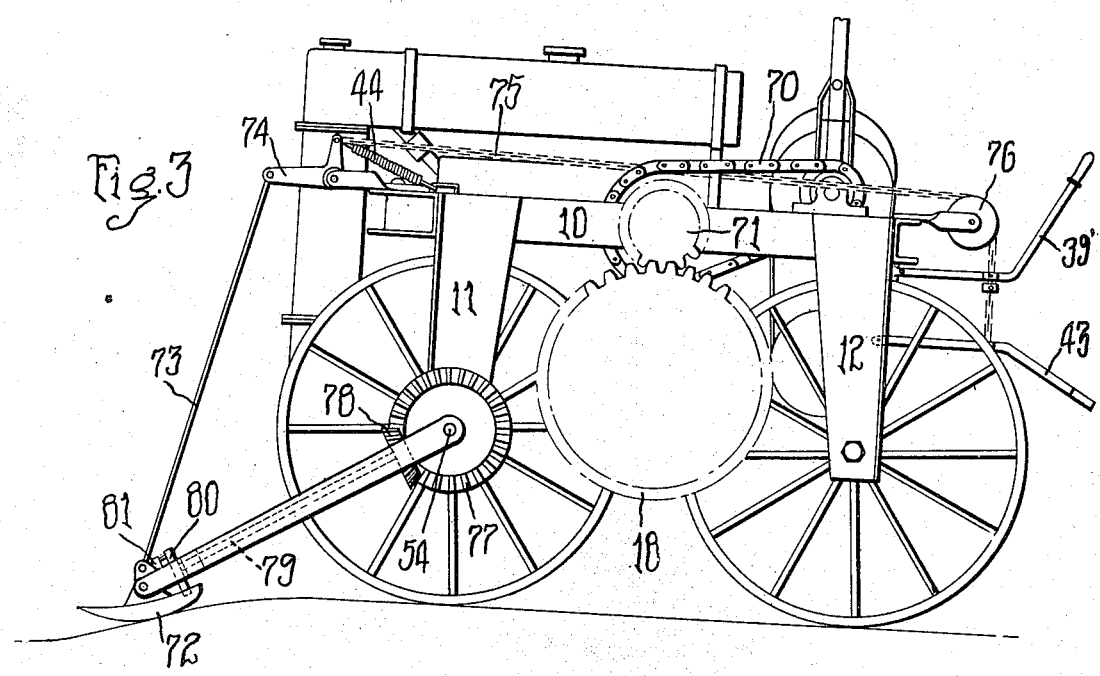
Fig. 3 is a similar view showing a modified form.

The embodiment of the invention shown in Fig. 3 involves a number of variations from the form already described. The gear 18, which may be arranged to drive the tractor wheels in the manner illustrated in Fig. 2, is shown as being driven by a chain 70 and pinion 71 engaging gear 18 in place of the gearing described above. The cutter-bar is provided with a ground engaging shoe 72 instead of the wheel 35, and is supported in part by the rod 73 connected to one arm of elbow lever 74, the other arm of which is joined by flexible connection 75 passing over pulley 76 to the hand and foot levers 39' and 43 respectively. The spring 44 in this case is connected to one arm of elbow lever 74 instead of to the chain. The sickle may be driven by a bevel gear 77 secured to shaft 54 and engaging a bevel gear 78, motion being transmitted through shaft 79, crank disk 80 and pitman 81 to the sickle in a manner common in implements of this character.

It will be understood that various modifications and changes in arrangement and details of construction may be made in addition to those above described without departing from the spirit and scope of the invention, and therefore I do not wish to be limited to the structure illustrated. It will also be understood that, while I have herein referred to a mower such reference has been merely illustrative as to the broader features of the invention and that other forms of harvesting implements and the like designed to travel over the surface, may likewise be included within the scope of the invention.

I claim:

1. The combination with a tractor frame, of a harvester mechanism carried thereby, a bearing member supported in said tractor frame, a ground wheel rotatably mounted upon said bearing member, and driving means for said mechanism comprising a shaft rotatably mounted within said bearing member.

2. The combination with a wheeled frame of a harvester frame pivoted thereto, cutting mechanism carried by said harvester frame, and driving mechanism for said cutting mechanism comprising a driving shaft arranged within the hub of one of the wheels of said wheeled frame and a pitman connecting said shaft to said cutting mechanism.

3. The combination with a tractor having a ground wheel, a harvester frame pivoted coaxially with said wheel, cutting mechanism on said frame, and means for driving said cutting mechanism comprising a shaft passing through the hub of said wheel and means on one side of the wheel for driving the shaft and on the other side of the wheel for connecting the shaft to said mechanism.

4. The combination with a tractor of a harvester frame mounted to swing vertically about a point of support on said tractor, means for suspending said harvester frame from another point of support on said tractor including a flexible element, and means for retracting said flexible element to lift the harvester frame comprising a plurality of actuating devices each operable independently of the other upon the same flexible element to retract said element.

5. The combination with a tractor of a harvester frame mounted to swing vertically about a point of support on said tractor, means for suspending said harvester frame from another point of support on said tractor including a flexible element, and means for retracting said flexible element to lift the harvester frame comprising a hand lever and a foot lever operable upon said element independently or simultaneously.

6. The combination of a traveling frame having an engine thereon, a harvester frame attached to said traveling frame, cutting mechanism carried by said harvester frame, means for elevating said harvester frame relatively to said traveling frame, and means for actuating said cutter mechanism from said engine comprising a belt, and means for tightening said belt, said tightening means provided with connections operable by elevation of said harvester frame to interrupt the actuation of said cutter mechanism.

7. The combination of a traveling frame having an engine thereon, a harvester frame attached to swing vertically about a point of support on said traveling frame, cutting mechanism on said harvester frame, means for elevating said harvester frame, means for actuating said cutting mechanism comprising a wheel concentric with said point of support, a belt for actuating said wheel from said engine, a tightener for said belt, and means for actuating said tightener to interrupt driving connections comprising a cam on said harvester frame and a reciprocatory element actuable by said cam.

8. The combination with a tractor comprising traction wheels, an engine, and gearing between said engine and each of said tractor wheels, of a harvester frame attached to said tractor to travel in front thereof, cutting mechanism on said harvester frame, means for actuating said cutter mechanism comprising a belt driven by said engine independently of said gearing, a tightener for said belt, manually operable means for controlling said tightener and means operable by elevation of said harvester frame relatively to said tractor for automatically controlling said tightener.

9. In combination with a tractor having an engine, of a harvesting implement attached to said tractor, cutting mechanism carried by said implement, driving connections between said engine and said cutting mechanism, means for interrupting said driving connections, and means for actuating said interrupting means comprising a lever mounted in position to be operable by the knee of the tractor driver.

10. The combination of a wheeled frame, an implement pivoted to said frame, means for raising said frame comprising a flexible element, a manually operable lever arranged to actuate said element by connections adapted to permit said element to be actuated independently of said lever, and pedal actuated means connected to said element to actuate the same independently of or simultaneously with the operation of said lever.

11. In a tractor harvester, a ground wheel, a tractor frame having a portion extending to the hub of the wheel on each side of said wheel, means connecting said frame portions and upon which the said hub is supported, and a harvester frame having bars on each side of said wheel pivotally supported by said tractor frame.

12. In a tractor harvester, a ground wheel, a tractor frame having a frame portion on each side of said wheel, means connecting said frame portions and upon which the hub of said wheel is supported, a harvester frame arranged to swing about the axis of the said wheel, cutter mechanism on said harvester frame and driving means for said cutter mechanism having a part rotatably supported within said frame connecting means.

13. A tractor harvesting implement comprising a frame having ground wheels, a harvester frame pivotally connected to said first mentioned frame to swing vertically, cutting mechanism on said harvester frame, means for driving said wheels in either direction, and means independent of said first mentioned driving means for actuating said cutting mechanism and comprising a belt pulley concentric with said pivotal connection.

14. A tractor harvesting implement comprising a tractor frame having ground wheels mounted thereon and an engine, a harvester frame pivotally connected to said tractor frame, concentrically with a pair of said ground wheels, means actuated by said engine for driving the ground wheels, and driving means for said harvester actuated by said engine independently of said first mentioned driving means and comprising a pulley concentric with said pivotal connection.

15. In a harvesting implement the combination of a traveling frame, a harvester frame connected to said traveling frame to swing vertically with reference thereto, flexible means suspending said harvester frame, and a resilient device connected directly to and operating upon said flexible device to yieldingly support a portion of the weight of the harvester frame and assist the floating movement of the latter in passing over obstructions.

In testimony whereof I affix my signature.

JOHN M. MEYERS.